United States Patent [19]
Jeunehomme

[11] 3,820,015
[45] June 25, 1974

[54] SENSOR FOR MEASURING THE CONCENTRATION OF ONE GAS IN A MULTIPLE GAS SAMPLE

[75] Inventor: Michele L. Jeunehomme, Farmington, Mich.

[73] Assignee: The Bendix Corporation, Southfield, Mich.

[22] Filed: Aug. 30, 1972

[21] Appl. No.: 284,794

[52] U.S. Cl. .................. 324/33, 250/384, 73/23
[51] Int. Cl. ................. G01n 27/62, H01j 37/00
[58] Field of Search .............. 324/33; 250/83.6 PT; 73/23

[56] References Cited
UNITED STATES PATENTS
1,808,709  6/1931  Blake ........................... 324/33 X
3,601,609  8/1971  Yauger, Jr. ............. 250/83.6 FT X

*Primary Examiner*—Alfred E. Smith
*Assistant Examiner*—Rolf Hille
*Attorney, Agent, or Firm*—John S. Bell

[57] ABSTRACT

A sensor for measuring the concentration of oxygen in exhaust gas from an internal combustion engine in which a source of low energy beta electrons for ionizing oxygen molecules is disposed in a secondary exhaust conduit is illustrated herein. A constant volume pump moves exhaust gas through the secondary conduit at a predetermined rate. A collector plate is disposed downstream from the source of beta electrons, and a potential difference is maintained between the beta electron source and the collector plate so that oxygen ions separate from any other ions that might be produced and strike the collector plate. The charge on that plate is then measured to determine the concentration of oxygen in the exhaust gas.

5 Claims, 1 Drawing Figure

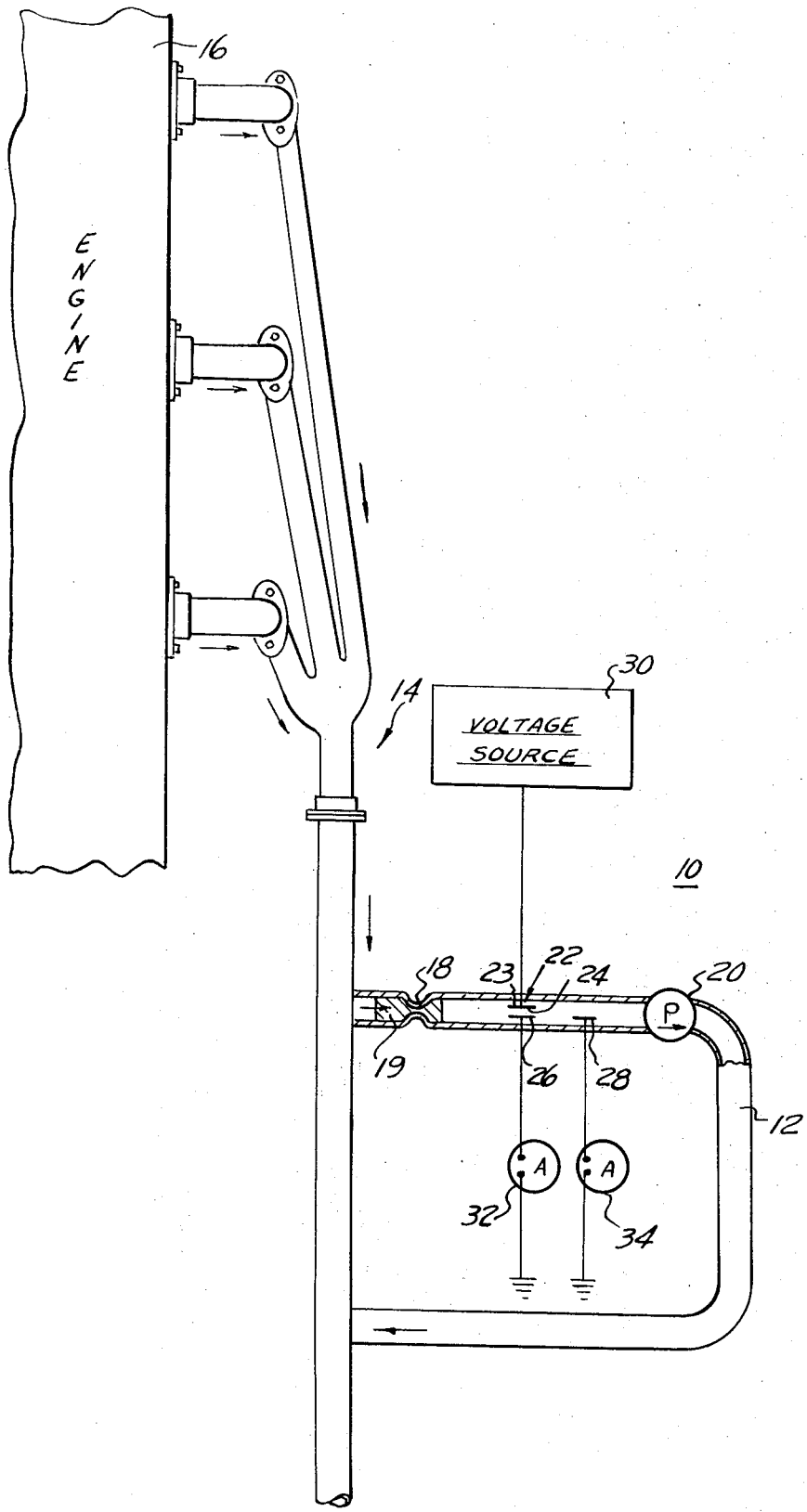

SENSOR FOR MEASURING THE CONCENTRATION OF ONE GAS IN A MULTIPLE GAS SAMPLE

BACKGROUND OF THE INVENTION

1. Field of the Invention

Sensors for measuring the concentration of one preselected gas in a multi-gas sample, and more particularly sensors for measuring the oxygen concentration in exhaust gas from an internal combustion engine.

2. Brief Description of the Prior Art

Measurement of the oxygen concentration in exhaust from an internal combustion engine identifies short term fluctuations in the air/fuel ratio being supplied to the engine and long term engine degradation that reduces the efficiency at which the engine is capable of operating. A number of different sensors for measuring the composition of engine exhaust are known. In one system, engine exhaust is directed to strike an electrically conductive wire. Changes in the composition of the engine exhaust alter the electrical conductivity of the wire by changing its temperature. Variations in electrical conductivity are measured to identify changes in the composition of the engine exhaust. One drawback of this system is that it merely indicates that a change has occurred in the composition of engine exhaust. It does not accurately and quantitatively indicate fluctuations of one component of the exhaust gas mixture such as oxygen. Oxygen forms such a small part of an exhaust gas mixture that changes in oxygen concentration often do not change the composition of the exhaust gas mixture sufficiently to permit detection with this sensor. Another drawback is that particles such as sulfur, lead, and phosphorous particles in engine exhaust coat the conductive filament and limit the life of the sensor.

In another exhaust gas monitoring system, a hollow zirconium dioxide cell is placed in an exhaust gas conduit. The outer surface of the cell is coated with a platinum for electrical contact and the inside of the cell is vented to air. Exhaust gas passes over the outside of the cell. The elevated temperature of the exhaust gas causes a potential difference to develop across the cell walls. The value of this potential difference depends on the partial pressure of oxygen on each side of those walls. Since the inside of the cell is vented to air, changes in the concentration of oxygen in engine exhaust change the partial pressure of oxygen, which in turn changes the electric potential difference across the cell walls. The potential difference is measured with a volt meter to determine the concentration of oxygen in the engine exhaust. One drawback of this system is that it has a limited operating life. Particles in the engine exhaust impinge on the platinum electrode and strip it from the zirconium dioxide. Another drawback is that the sensor may be damaged if used with fuel containing lead additives by having a coating of lead form on the platinum and prevent the sensor from providing any output. In addition, zirconium dioxide is mechanically weak and cannot withstand the vibrating environment of an engine exhaust system for very long.

SUMMARY OF THE INVENTION

This invention comprises a simple and inexpensive sensor capable of accurately measuring small changes in the concentration of one gas in a multi-gas sample. The sensor has a long operating life. And, embodiments can be constructed for a wide range of applications, including the measurement of oxygen in exhaust from an internal combustion engine burning fuel containing lead additives. The sensor comprises a source of low energy nuclear radiation for ionizing a gas sample, apparatus for distinguishing or separating ions of the gas whose concentration is to be measured from any other ions that might be produced, and a meter or similar device for measuring the concentration of the separated ions.

The embodiment illustrated herein is a sensor for measuring the concentration of oxygen in the exhaust from an internal combustion engine. The source of low energy radiation comprises a $^{63}$Ni coated electrode that emits low energy beta electrons having only enough energy to penetrate a few millimeters into engine exhaust gas. The radiation source is thus very safe. However, the source provides a relatively strong, easily measurable signal representing the concentration of oxygen in the exhaust gas; each beta electron may ionize as many as one hundred oxygen molecules. The $^{63}$Ni coated electrode is also a simple and inexpensive source with a long operating life on the order of several years. The beta electron source is disposed in a secondary exhaust conduit connected to receive some of the engine exhaust flowing through the main or primary exhaust pipe from an engine. A constant volume pump controls gas flow and maintains a predetermined constant volume of exhaust gas in the secondary conduit. Since the volume of exhaust gas in the secondary conduit is known, the percentage or concentration of oxygen in the engine exhaust can be determined simply by measuring the amount of oxygen in the secondary conduit or in any predetermined portion of that conduit such as the area proximate the beta source.

The pump moves exhaust gas through the secondary conduit at a predetermined rate. In order to distinguish oxygen ions from any other ions that might be produced, a collector plate is disposed downstream from the radiation source, and a sufficient potential difference is maintained between the radiation source and collector plate so that oxygen ions flowing at the predetermined rate maintained by the pump separate from other ions and strike the collector plate. The exhaust gas flow through the conduit and predetermined potential difference between the beta electron source and the collector plate contribute to the long life of this sensor by causing particles of other materials that might coat the collector plate to follow other paths and miss that plate. A simple ammeter can be used to measure the collector plate current and thereby identify the quantity of oxygen or other selected gas in the sample.

In the sensor illustrated herein, a second collector plate is disposed opposite the source of beta electrons. This plate collects secondary electrons created by the beta electrons. The charge on this second collector plate is measured to monitor operation of the beta electron source.

BRIEF DESCRIPTION OF THE DRAWING

Further objects, features, and advantages of this invention, which is defined by the appended claims, will become apparent from a consideration of the following description and the accompanying drawing which is a schematic, plan, partially cutaway view of a sensor for measuring the concentration of oxygen in exhaust from an internal combustion engine.

DETAILED DESCRIPTION OF THE PREFERRED EMBODIMENT

The FIGURE illustrates a sensor 10 that includes a secondary pipe or conduit 12 for receiving a portion of the engine exhaust flowing through a main or primary exhaust pipe 14 from an internal combustion engine 16. A constriction 18 is formed at the inlet to conduit 12 to minimize the size pump required to maintain a preselected flow velocity in conduit 12. Constriction 18 holds a filter 19 at the inlet to conduit 12 to block a portion of the particles such as carbon, phosphorous and lead particles often found in engine exhaust from the flow entering conduit 12. A pump 20 is connected to draw exhaust gas from conduit 14 into conduit 12. Pump 20 causes exhaust gas to flow through conduit 12 at a predetermined constant rate. The pump is a constant volume pump and therefore also maintains a predetermined constant flow of exhaust gas in conduit 12 so that it is only necessary to measure the amount of oxygen in the conduit or a preselected section of the conduit in order to determine the concentration or percentage of oxygen in the exhaust gas.

A source 22 of low energy beta electrons for ionizing oxygen molecules in the exhaust gas comprising an electrode 23 having a coating 24 of $^{63}$Ni painted or plated thereon, and two collector electrodes 26 and 28 are disposed in conduit 12. Collector plate 26 is opposite source 22 to receive secondary electrons and monitor operation of the beta source. Collector 28 is positioned a predetermined distance downstream from source 22 to receive oxygen ions. A voltage source 30 is connected to provide a voltage to electrode 23 and maintain a predetermined potential difference between electrode 23 and collector plates 26 and 28. Collector plates 26 and 28 are electrically insulated from conduit 12 and respectively connected to ground through ammeters 32 and 34 which measure the number of ions collected on those plates.

Different embodiments of the sensor 10 may have different dimensions. However, it will often be advantageous to construct a relatively small embodiment to minimize the magnitude of the potential difference that must be maintained between electrode 23 and collector plates 26 and 28. Therefore, in a typical embodiment, conduit 12 might have a diameter of approximately 1 centimeter. An electric field of 300 volts per centimeter provides negative oxygen ions with a drift velocity of about 1,000 centimeters per second at atmospheric pressure. If such a potential is maintained between electrode 23 and collector plates 26 and 28, and pump 20 provides a flow velocity of 1,000 centimeters per second, the center of collector plate 28 would be disposed one centimeter downstream from the center of electrode 23.

In operation, pump 20 draws a portion of the exhaust gas in conduit 14 through conduit 12 at a predetermined rate. Pump 20 also maintains a predetermined constant volume of exhaust gas in conduit 12. Oxygen molecules in the exhaust gas are ionized by beta electrons from source 22. These beta electrons penetrate only a short distance on the order of several millimeters into the exhaust gas so that all oxygen ions are formed adjacent beta electron source 22. Since all oxygen ions are formed in the same area, the exhaust gas flow and electric potential difference across conduit 12 carry all of those ions to collector 28. Any ions of other gases that might be formed are carried along different paths by the electric field and exhaust gas flow and do not strike collector 28. Even though beta electrons penetrate only a few millimeters from source 22, each beta electron may produce as many as 100 oxygen ions. A strong electric current thus reaches the collector plate 28. And, measurement of the ion current on collector plate 28 by meter 32 accurately indicates the concentration of oxygen in the exhaust gas from engine 16. The operation of engine 16 can be controlled by supplying the electric signal from collector plate 28 to a servo control system for controlling the air/fuel ratio supplied to that engine. Beta electrons from source 22 also interact with engine exhaust to produce secondary electrons. These secondary electrons are collected by plate 26, and the charge of that plate is measured by meter 32 in order to monitor operation of source 22.

Having thus described one embodiment of this invention, a number of modifications will readily occur to those skilled in this art. For example, embodiments of the sensor of this invention may be used to measure the concentration of a gas other than oxygen in a multi-gas sample other than exhaust from an internal combustion engine. In addition, sources of low energy radiation other than an electrode with a coating of $^{63}$Ni may be used in other sensor embodiments. Further, in the illustrated embodiment, a constant volume of exhaust gas is maintained in conduit 12 so that it is only necessary to measure the quantity of oxygen in a particular preselected area, namely the area proximate electrode 23, in order to determine the concentration or percentage of oxygen in the exhaust gas. In other embodiments, the number of ions of different materials can be measured and compared with a number of oxygen ions in order to determine oxygen concentration.

Therefore, what is claimed is:

1. A sensor for measuring the concentration of one preselected ionizable gas in a sample containing molecules of a plurality of different gases comprising:
   a conduit for receiving a gas sample containing the one preselected ionizable gas to be measured;
   means for imparting to said received gas sample a predetermined axial flow velocity through said conduit;
   a source of low energy nuclear radiation disposed at a first location in said conduit to generate ions by ionizing a portion of said gas sample flowing at said predetermined axial flow velocity;
   means operative at said first location for generating a field to impart to said generated ions a predetermined drift velocity in a direction transverse to said flow velocity; and
   means disposed at a second location downstream from said first location a distance determinable from said flow velocity and said drift velocity for collecting ions indicative of only the preselected ionizable gas, and for generating a signal indicative of the concentration of said preselected ionizable gas.

2. The sensor of claim 1 in which said at least one preselected gas is oxygen in the exhaust gas from an internal combustion engine:
   said conduit comprises a secondary conduit for receiving a portion of the engine exhaust flowing through a main exhaust conduit from an internal combustion engine;

said means for imparting a predetermined flow velocity includes a pump for moving exhaust gas through said secondary conduit at a predetermined velocity and for maintaining a predetermined constant volume of exhaust gas in said secondary conduit; and said means for generating a field includes:

an electron collector plate disposed opposite said source of nuclear radiation; and means for maintaining a sufficient potential difference between said source of nuclear radiation and said electron collector plate to generate an electric field sufficient to cause oxygen ions flowing with said exhaust gas at said predetermined flow velocity to be accelerated in a direction generally normal to said flow velocity and to strike said means for collecting ions.

3. The sensor of claim 2 in which said source of low energy nuclear radiation comprises a source of beta particles.

4. The sensor of claim 3 in which:

said beta source comprises a coating of $^{63}$Ni disposed on an electrode.

5. The sensor of claim 3 in which:

beta particles from said beta source interact with exhaust gases and create secondary electrons; and the sensor further includes:

means for measuring the number of secondary electrons striking said collector plate to thereby monitor the operation of said beta source.

* * * * *